8069X
H. Beebe.
Making Vehicle Wheels.
Patented Mar. 12. 1834.
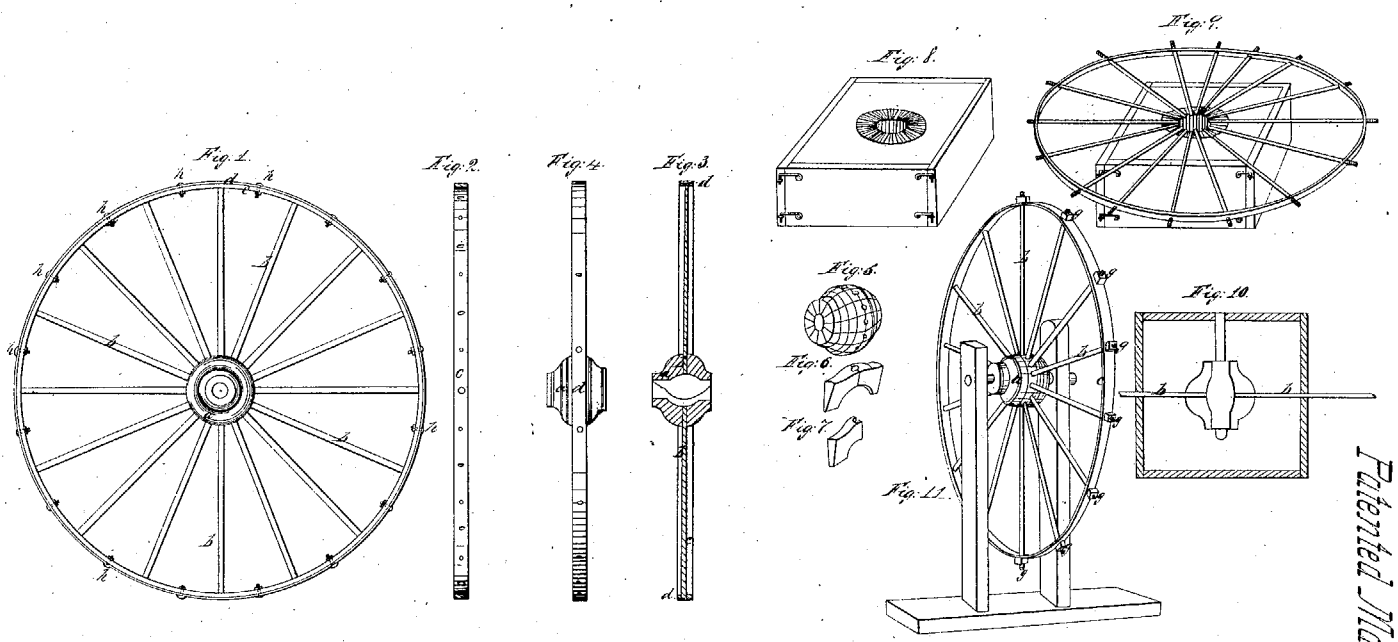
N. PETERS, PHOTO-LITHOGRAPHER, WASHINGTON, D. C.

Mar. 12. 1834 No. 14

Henry Beebe
Letters Patent

The Schedule referred to in these Letters Patent and making part of the same
containing a description in the words of the said Henry Beebe himself
of his improvement in the construction of wheels for the use of all kinds
of Carriages To all to whom these presents shall come. Be it known that I Henry Beebe
of the Town of Haverstraw in the County of Rockland and State of New-
York have invented a new and useful improvement in the construction
of wheels for the use of all kinds of Carriages such as Stages, waggons, carts,
gigs Coaches, rail road cars and other kinds of transportation vehicles which
invention he calls "The metallic vehicle circular wheel" and that the fol-
lowing is a full and exact description of the construction and operation
of the said machine as invented or improved by me. The wheel to consist
of the Hub, spokes, rim and tire with such other appendages thereto as are herein-
after mentioned. The spokes and the rim to consist of wrought or mallea-
ble iron or steel the hub of ~~of~~ cast iron, brass composition of metal or of
any metallic substance. The tire of wrought or malleable iron laid with
or without steel. The rim of the wheel to be circular of such diameter as
the constructor may choose and as may be appropriate to the use for which
it is intended. If the wheel is to be of the diameter of four feet and an half
the thickness of the rim should be about five sixteenths of an inch and the
width about one inch and three eighths. This rim to be made by bending
the bar of the material of which it is to be made into a circular form and fasten-
ing the two ends by welding or otherwise at the option of the constructor, or
the rim may consist of segments or fellies Either before or after the rim is
formed it is to be pierced with as many holes as there are intended to be spokes
to the wheel. twelve or fourteen more or less at the option of the constructor,
these holes to be equidistant from each other and to be in the middle of the
rim and of such size as may be deemed expedient regard being had to the
use intended to be made of the wheel, to the size of the wheel and the mate-
rials

[illegible] of the spokes and rim being for the reception of the spokes. The spokes to be made of a length adapted to the size of the rim to be of solid or hollow iron or steel. Either round or otherwise as may suit the constructor on one end of each spoke is to be cut a screw and a nut put on the same. the end of the spoke on which is to be cut the screw to be of a size to fit the holes to be cut in the rim. the ends of the spokes to be inserted in the holes in the rim keeping the nuts on the screws on the inside of the rim. After the spokes are thus inserted in the rim the whole is to be placed on a form for receiving the hub. A pattern of wood or other Material is to be made for the hub of the form and dimensions adapted to the size and strength of the intended wheel and of the appropriate proportions on the out-side with the addition of the core prints which are to be of the size of the in-tended hole at each end of the hub. the pattern is then to be divided into as many parts as the number of spokes intended for the wheel. Holes are then to be made in the pattern for receiving the other ends of the spokes to be of suitable size and depth for the spokes and hub. The pattern is then to be sawed into two parts through that part of the holes intended for the centre of the spokes, then place the pattern in the centre of the wheel or rim with a screw passing through the centre of each core print with a nut on the under side so as to be drawn when the mould is made for the hub. the mould for the hub is then made on the pattern after which the screw is drawn and the upper part of the mould and pattern is drawn leaving the ends of the spokes which entered the pattern are half open then the rim is drawn from the form with the spokes. Then the under part of the pattern is drawn from the under part of the mould. Thus the mould for the hub is completed ready to receive the core which forms the inside of the hub for the reception of the axletree. The shape of the core is to be such as may be required for the hole of the inside of the hub to be of a taper fitted for the axletree and to be of a shape to make a hollow in the hub between the boxes corresponding as near as may be to the bulge on the outside of the hub. The object and use of which is to provide a re-ceptacle for oil or grease for the wheel and to diminish the weight of the hub. The hub may be formed with or without this hollow or receptacle receptacle. The core is to be placed in the prints or moulds in its appropriate position for forming the inside of a hole through the hub and the rim and spokes are then to be placed in the moulds or prints as when moulded then the flask is to be closed. The metal of which the hub is to be made is poured in into the moulds or prints and thus the hub is formed. The rim spokes and hub then to be removed and freed from the sand and the core removed, then a centre pin of wood or any other material to be put through the hole in the hub made for the axle tree on which pin turn the wheel thus formed to discover if the rim be true with the centre of the hub. turn the nuts on the ends of the spokes on the inside of the rim snug up to the rim and if the rim be not true with the centre of the hub turn the nut so as to push out the rim to make it true, the ends of the spokes which are inserted in the rim to pass quite through it after the rim is made true to the centre of the hub. after the rim is made true the ends of the spokes which pass through it are to be made even with the outside of the rim by cutting them off or filing them down if they project beyond it. The tire of the wheel is made of a bar of iron wrought or malleable laid with steel or not at the option of the constructor and formed to fit the outside of the rim above described as to width and diameter and to be of such thickness as the constructor may choose. The tire is made hot and while hot put on to the rim and then cooled by water so as to make it tight on to the rim and spokes, it may be further secured on to the rim and spokes by bolts passing through the tire and rim between the spokes in such number as may suit the constructor. These bolts may be made to extend through the rim and hammered down on the inside or have a screw on the end of each inside the rim with a nut; on each end of the hub may be fixed a band of wrought or malleable iron if the constructor shall see fit in order to protect the ends of the hub. The rim of the wheel instead of being made of iron may be made of wood at the option of the constructor as in the ordinary modes now in use in making wheels. The invention hereby claimed and desired to be secured by Letters Patent consists of the whole of the machine or wheel above described when taken together and the mode and manner of constructing the same particularly the principle
of constructing the hub upon the iron or steel spokes. But no claim is
made for the mode of making the hub, the spokes, the rim or the tire
or any of the parts of the wheel or machine taken separately.
For a further illustration of my invention I refer to the model and
drawing of the same deposited in the patent Office. In testimony
whereof I have hereunto subscribed my name this twenty first day of
February one thousand eight hundred and thirty four Witnesses
Wm. T. Steiger
Chs. M. Keller Henry Beebe 15 00

Drawing

[illegible] Ch[illegible]